May 30, 1950  J. DINEEN  2,509,813
EMERGENCY DISCONNECT MEANS FOR AUXILIARIES
Filed Sept. 29, 1947  2 Sheets-Sheet 2

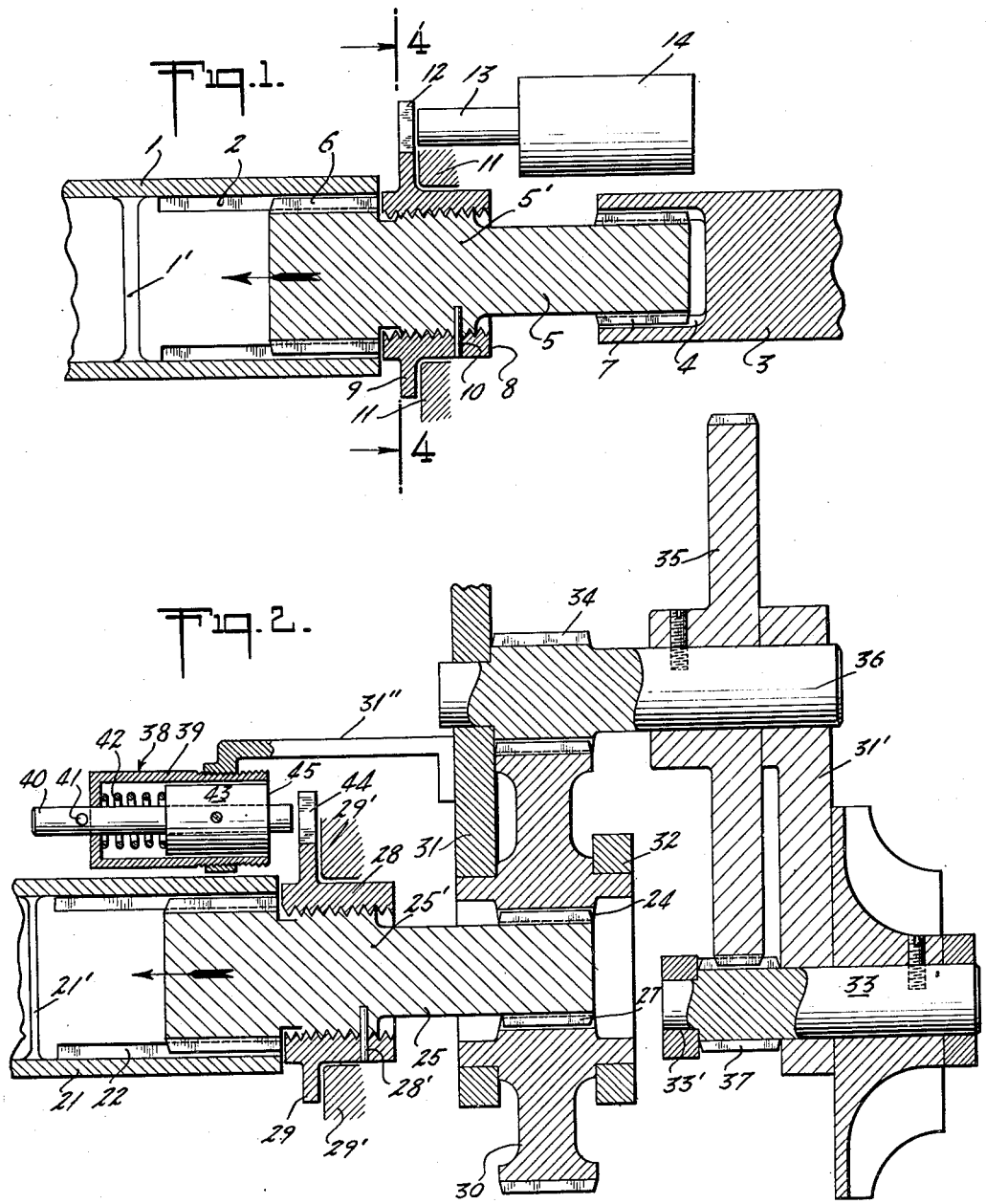

INVENTOR
JOHN DINEEN
BY
Bartlett Eyre Keel & Weymouth
ATTORNEYS

UNITED STATES PATENT OFFICE 2,509,813

EMERGENCY DISCONNECT MEANS FOR AUXILIARIES

John Dineen, Sea Cliff, N. Y., assignor to Stratos Corporation, Babylon, N. Y., a corporation of Delaware Application September 29, 1947, Serial No. 776,759

21 Claims. (Cl. 192—101)

This invention relates to a disconnect device or means for disconnecting auxiliary driven units in an emergency.

One object of the invention is a novel and improved device or means of the above indicated character which is characterized by its simplicity in structure and operation, its lightness in weight, its compactness and by the certainty with which it may be operated to disconnect the driven auxiliary unit in an emergency.

Further objects of the invention will hereinafter appear.

For a better understanding of the invention reference may be had to the accompanying drawings forming a part of this application, wherein Fig. 1 is a sectional view somewhat diagrammatic of a device embodying the invention;

Fig. 2 is a sectional view of another embodiment;

Figure 3:
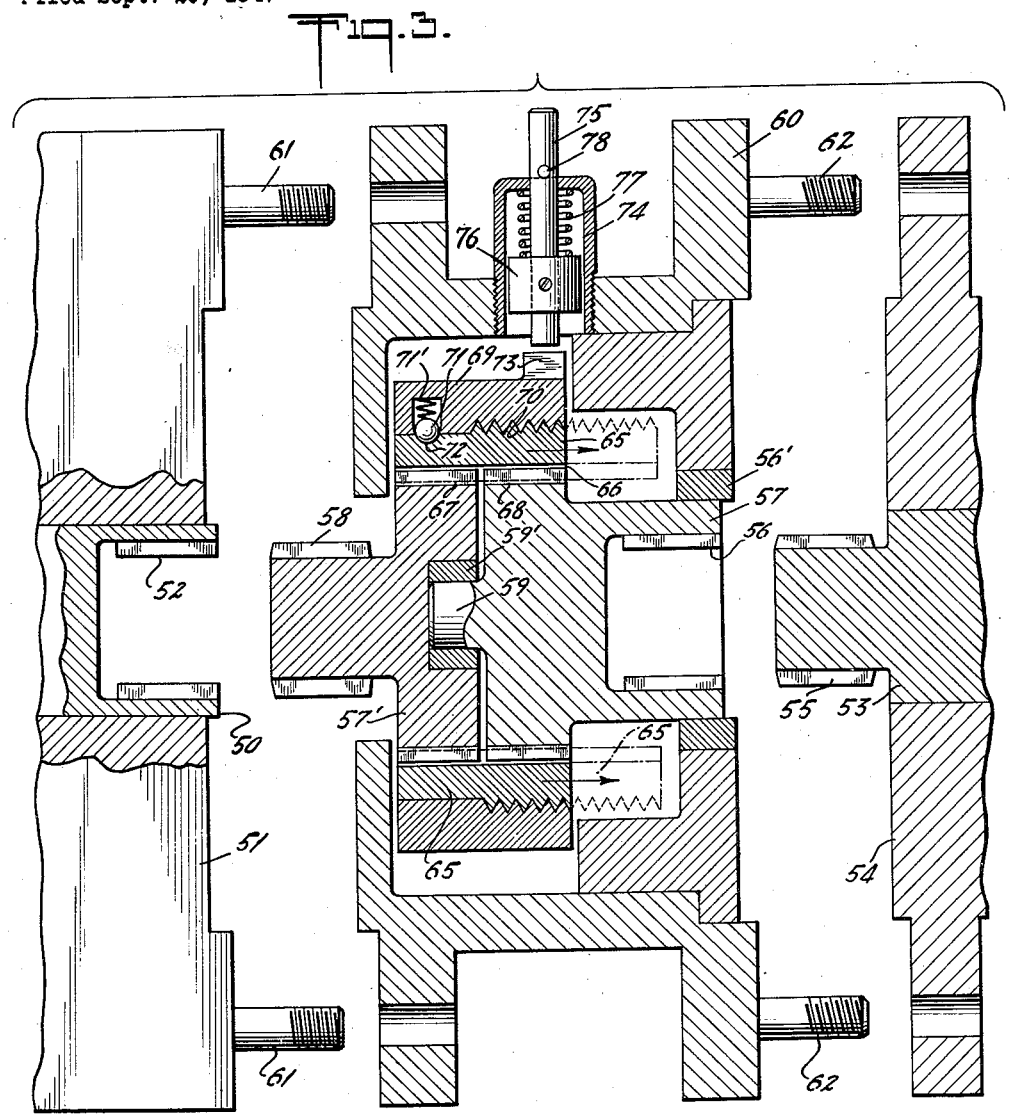
Fig. 3 is a sectional view of another embodiment.

Referring to the drawings, I have illustrated my invention as embodied in a device or means particularly adaptable for the emergency disconnection of aircraft auxiliaries such, for example, as oil pumps, generators, superchargers, etc. By the use of this invention the auxiliary may be disconnected with certainty and with the desired rapidity in an emergency, thereby contributing to the safety of the operation of the craft, the safety of the personnel and the preservation of the auxiliary unit against excessive damage.

In Fig. 1 I have schematically illustrated a device or means embodying my invention as applied to aircraft auxiliaries for emergency disconnection from the power plant, but it is understood that this disconnect device or means has other applications of use. The engine shaft or the shaft geared or coupled to the engine is designated by the numeral 1 and this part of the shaft is illustrated as hollow or of cylindrical shape having conventional splined grooves 2 illustrated on the inner surfaces of the shaft 1 and a partition or plate 1' to limit the longitudinal travel of the disconnect shaft 5 as will be described.

I have indicated at 3 a drive shaft geared to or coupled to the auxiliary unit to be driven such as an oil pump, a generator, a supercharger, etc. This shaft is illustrated as hollowed out at its end shaft 1 and is provided with splined grooves 4 on the interior thereof. These splined grooves 4 are, in the particular embodiment shown, illustrated as being of lesser length than the splined grooves 2 of the shaft 1 and as particularly illustrated are of approximately half the length of the splined grooves 2.

My emergency disconnect device or means is provided for disconnecting the shaft 1 and the shaft 3 in an emergency. It comprises a shaft 5 having on its lefthand end and on the exterior thereof the splines 6 which cooperatively function with the splined grooves 2 to couple the lefthand end of the shaft 5 with the shaft 1. The splines 2, 6 may be of conventional character which allows for small degrees of misalignment and helps dampen torsional vibrations. The spline 6 is less than one-half the permissible length of the spline in the engine shaft 1 in order to provide the desired flexibility. The righthand end of the coupling shaft 5 is provided with splines 7 on its exterior for cooperatively functioning with the splined grooves 4 of the shaft 3. Accordingly when the splined coupling shaft 5 is in the position shown in Fig. 1 the auxiliary unit driving shaft 3 is coupled to the engine shaft 1.

The spline coupling shaft 5 is provided intermediate its length with an externally screw threaded part 5' and a thrust nut or sleeve 8 is screw threadedly attached to the portion 5' of the spline coupling. This thrust nut 8 is normally prevented from relative rotation on the spline coupling shaft by means of a shear pin 10. This shear pin needs to be only sufficiently strong to overcome inertia loads imparted to the pin by the inertia of the mass of the thrust nut. It carries no part of the load between the shafts 1 and 3. The thrust nut 8 is provided with a flange 9 and at 11 I have indicated a stationary thrust bearing or block of only slightly larger diameter than the nut 8 which during normal operation is spaced slightly from the flange 9 but upon the operation of the emergency disconnect device engages the flange 9 as described below.

The threaded portion 5' of the spline coupling shaft is of sufficient length so that the axial movement provided by the thrust nut 8 is greater than the length of the spline 7 on the righthand end of the spline coupling shaft, namely, the threaded portion 5' is longer than the splines 7. Therefore by arresting the rotation of the thrust nut 8 during the rotation of the engine shaft 1 the splined coupling shaft is automatically and rapidly moved toward the left in the direction of the arrow to positively disconnect the spline coupling shaft 5 from the shaft 3. Leftward movement of shaft 5 is limited by the plate 1' in shaft 1. Any suitable means may be provided for arresting the rotation of the thrust nut 8. In the particular embodiment shown the thrust nut 8 is provided with a tooth 12, the latter being formed on and as a part of the flange 9. A locking or stop pin 13 is mounted for movement in the path of the tooth 12 by any suitable means. When this locking pin 13 engages the tooth 12 the thrust nut 8 is arrested in its rotation thereby shearing off the shear pin 10. The spline coupling shaft 5 is moved axially to the left by the thrust nut to disengage the righthand end of the spline coupling 5 and its driving spline 7 from the shaft 3.

In the particular embodiment shown I have illustrated only a single tooth 12 on the thrust nut 8 since this gives the maximum time for the locking pin 13 to reach its locking position. If faster operation is desired more teeth may be added. The locking pin 13 may be operated by any suitable control device such as a solenoid or a flexible cable. This may be done manually as, for example, pulling a flexible cable or by manually closing the circuit of a control solenoid. It may also be controlled automatically as, for example, responsive to oil level or oil pressure control.

At 14 I have illustrated a mount for the locking pin 13 and in the particular embodiment illustrated the pin is adapted to have a movement parallel to the spline coupling shaft 5. This locking pin 13 may be biased toward the left in any suitable manner as, for example, by spring means and locked in the position shown to enable the tripping of the lock to permit the locking pin 13 to engage and arrest the thrust nut 8. As indicated I have purposely avoided illustrating in Fig. 1 any particular means for moving the locking pin 13 into a position to engage the tooth 12.

If desired the locking pin means 13 may be arranged to apply a braking pressure to the flange 9 or some part of the thrust nut 8 sufficient to shear the shear pin 10 just before the pin 13 engages the locking tooth 12. By this arrangement the force normally required to shear the pin 10 will be carried by the braking means while the locking pin 13 need only operate to prevent rotation of the nut 8. Possible damage or injury to the locking means and subsequent replacement thereof is thereby avoided.

Upon actuation of the locking means to arrest rotation of the nut or sleeve 8, the shaft 5 will continue to rotate. Since the nut 8 threadably engages the shaft 5, relative rotation between the two will cause the shaft 5 to be moved to the left and withdraw its splines 7 from engagement with the internal splines 4 on the shaft 3. Leftward movement of the shaft then continues until the nut 8 is completely out of engagement with the threaded part 5' of the shaft 5.

With the completion of this leftward movement, the threaded part 5' is contained almost wholly within the hollow recess in the shaft 1, and it is therefore important that the outside diameter of this threaded section be somewhat less than the internal diameter of the splines 2. Moreover, since the engine shaft 1 continues to rotate after disengagement of the shaft 3, sufficient clearance between the thrust nut 8 and the splines 7 on the righthand side of the shaft 5 should be provided for.

The thrust nut 8 is supported in this disengaged position by the stationary thrust bearing or block 11, and I prefer to make the clearance between the threads on the part 5' of the shaft 5 and the splines 2 on the engine shaft 1 fairly small so that wobble of the shaft 5 will be minimized when it is in the disengaged position. It is evident, however, that the driving and driven shafts can also be reversed so that the disconnect assembly will be at rest when the disconnecting operation is complete.

The foregoing description clearly indicates the simplicity and effectiveness of my disconnect device and the ease with which it may be controlled. As pointed out the locking means 13 may take any desirable form and may be automatically or manually operated by either electrical, mechanical or electro-mechanical means.

I have illustrated another form of my invention in Fig. 2 wherein it is coupled to a supercharger, generator or like piece of auxiliary equipment. In this figure the splined coupling shaft 25 is engaged on its lefthand end with companion splines 22 on the engine shaft 21 and on its righthand end with the internal splines 24 on a spur gear 30. This spur gear is journaled in frame members 31 and 32 and is mechanically coupled with the supercharger or generator shaft 33 by means of cooperating spur gears 34 and 35 on a countershaft 36 and a spur gear 37 on the supercharger or generator shaft 33. The countershaft 36 is journaled in frame members 31 and 31' while the shaft 33 is rotatably supported by frame members 31' and 33'.

As in Fig. 1, the shaft 25 has a threaded part 25' with a threaded nut or sleeve 28 engaged therewith. A shear pin 28' engaging both the nut 28 and the shaft 25 prevents rotation therebetween under normal operating conditions.

In this embodiment of the invention a mechanically operated actuating or locking pin assembly 38 is illustrated, and includes a cup-shaped case 39 mounted in a horizontal position in a frame member 31''. Extending through the cup 39 is a locking pin 40 held in retracted position by a transverse pin 41 against the action of spring 42 surrounding the shaft 40 and retained between a fixed collar or cylinder 43 on the shaft 40 and the closed end of the housing 39. Upon release of the locking pin 40 by removal or shearing of the pin 41 it will move to the right so that the righthand end of shaft 40 will engage the tooth 44 on the flange 29 to shear the pin 28' and arrest rotation of the nut 28. The right end 45 of collar or piston 43 limits the movement of the locking pin on removal or shearing of the pin 41.

The operation of this form of the invention is similar to that shown in Fig. 1. The pin 41 may be arranged with suitable cables so that it can be withdrawn at the will of an occupant of the plane or vehicle on which the disconnect is used or it may even be a fusible pin so that it will melt and release the locking pin 40 in the event of fire or predetermined temperature rise. Upon release of locking pin 40, it will move to the right to engage a tooth 44. Since the shaft 21 continues to rotate, the pin 28' will be sheared and relative rotation between the nut 28 and the shaft 25 initiated. Since the nut 28 is held against longitudinal movement by the stop 29' the shaft 25 will be displaced to the left, and its splines 27 will be withdrawn from engagement with the internal splines 24 on the spur gear 30. Disengagement of the shaft 25 with the spur gear 30 interrupts the transmission of power from driving shaft 21 to the supercharger or generator shaft 33. Upon disengagement of the nut 28 and the shaft 25, the nut will be supported by the stop collar 29'. Since sufficient clearance is maintained between the nut 28 and the shaft 25 when in the disengaged position, continuing rotation of the shaft 25 will not change any of the operating portions of the device.

In Fig. 3 I have illustrated a partially exploded or disassembled view of another form of the invention wherein the disconnect shaft is formed of two concentrically disposed parts adapted to be disengaged by movement of a surrounding nut or sleeve while each part of the disconnect shaft remains in engagement with its respective driving or driven shaft.

It more particularly includes an engine shaft 50 carried by the housing 51 and is provided with a series of internal splines 52 for engagement with the external splines 58 on the driving shaft part 57' of the coupling device. As distinguished from the other embodiments of the invention, it will be noted that the splines 52 are relatively short in length and provision is not made for longitudinal displacement of the shaft 57' therein. The shaft 53 is carried by a housing 54 and is provided in this embodiment with external splines 55 for engagement with the internal splines 56 formed in the right side of the shaft part 57. The two parts 57 and 57' of the coupler are maintained in alignment by a concentric cylindrical stud 59 on shaft part 57 cooperating with a suitable bearing 59' on the shaft part 57'.

The shaft parts 57 and 57' are disposed within the intermediate housing 60 and are retained in alignment and in engagement with their respective shafts 53 and 50 upon the attachment of housings 51 and 54 to the intermediate housing 60, suitable bolts 61 and 62 on the housings 51 and 60 and cooperating holes in the housings 60 and 54 being provided for this purpose. The shaft part 57 is journaled in housing 60 by means of housing 56' to provide added support for the shafts and assist in maintaining the alignment thereof.

In this embodiment the shaft parts 57 and 57' are held against transverse movement and remain in engagement with their respective driven and driving shafts at all times. Transmission of power between the shaft parts 57' and 57 is accomplished by a composite sleeve structure having an inner coupler or sleeve part 65 and an outer sleeve or nut part 69.

Figure 4:
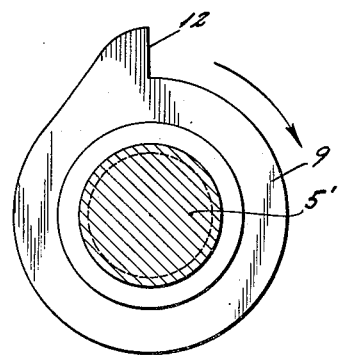
Fig. 4 is a sectional view along the line 4—4 of Fig. 1.

The inner part 65 is provided with splines 66 extending throughout its length and engaging corresponding splines 67 and 68 on the periphery of the shaft parts 57' and 57, respectively. The outer nut part 69 is threadably engaged with the inner coupler part 65 by means of the threads 70 and are maintained in engagement and alignment with each other by means of a spring loaded ball 71 in the outer nut part 69 and a cooperating hemispherical recess 72 in the inner part 65. The outer part is also provided with one or more teeth 73 in much the same manner as illustrated at 12 in Fig. 4.

The actuating or locking pin assembly is similar to that described in connection with Fig. 2 and comprises a cup-shaped housing 74 threadably secured in the intermediate housing 60 so that its centrally disposed locking pin 75 can engage the tooth 73 on the nut part 69. The locking pin 75 is provided with a cylindrical collar 76 fixedly mounted thereon, and a spring 77 positioned between the cylindrical collar and the closed end of the housing 74. The spring 77 is normally maintained in compressed position by a pin 78 with the lower end of the locking pin 75 spaced from the periphery of teeth 73. The pin 78 may be arranged to be withdrawn for the disconnecting operation, either mechanically or electrically and either manually or automatically, or it may even be a fusible pin that will melt at a predetermined temperature.

With the removal or melting of this pin 78 the shaft 75 will be urged downwardly by the spring 77 to engage the tooth 73. This action will arrest the rotation of the outer sleeve or nut part 69 and cause the ball 71 to be forced out of engagement with the hemispherical opening 72 in the coupler part 65. Continued relative rotation between the parts 65 and 69 causes the part 65, by reason of the thread 70, to be moved to the right until the corresponding threaded portions of the nut parts 65 and 69 are totally disengaged. The disengaged position of the part 65 is illustrated by dotted lines in this figure. Since the length of the threads 70 exceeds the length of the splines 67 on the shaft part 57', splines 66 on the coupler part 65 will be moved completely out of engagement with the splines 67 and thereby disconnect the shaft part 57' from the shaft part 57 to interrupt transmission of power to the shaft 53.

If desired, means may be employed to arrest the outward or downward movement of the ball 71 when the inner nut part 65 is moved to the right. For instance, the edge of the recess housing the ball 71 and the spring 71' can be peened lightly or provided with a small ridge so that the ball will be retained within its recess when the nut parts 65 and 69 are completely disengaged.

My invention provides an extremely light and compact disconnect device that may be used to disconnect a driven auxiliary unit, such as a generator or supercharger in the case of aircraft or other vehicles either in case of an emergency or upon the occurrence of a predetermined condition. My invention is positive in its action and can be arranged to be operated in a variety of ways. For instance, the actuating or locking pin can be operated by hand or automatically in response to oil pressure, oil level, heat or other similar conditions, and may be wholly mechanically operated, electrically operated, or electro-mechanically operated. The device is so constructed and arranged that it may be readily and easily incorporated in existing equipment by the use of an intermediate housing structure such as that shown in Fig. 3, or its may readily be designed as part of new equipment.

I claim:

1. A disconnect device for coupling a drive shaft with a driven shaft comprising a splined coupler member adapted to be connected to said shafts to transmit power therebetween, said coupling member having a portion thereof screw-threaded, a thrust nut screw-threadedly attached to said threaded portion of said coupler and releasably locked against relative rotation thereon by a substantially non-torque transmitting means, said coupler being disengageable from one of said shafts by longitudinal movement of a predetermined distance and said threaded portion of the coupling member and the threaded portion of the thrust nut being arranged to impart to the coupling member a movement through said predetermined distance, and means for arresting the motion of said thrust nut to cause said coupler member to move through said predetermined distance.

2. The combination with a drive shaft and a driven shaft mounted in line, of a splined coupler member in line with said shafts and having splined connections at its ends cooperating respectively with said shafts, said coupling member having a portion thereof screw-threaded, a thrust nut screw-threadedly attached to said threaded portion of the coupler and locked against relative rotation thereon by a substantially non-torque transmitting locking means, said coupling member being disengageable from one of said shafts by longitudinal movement of a predetermined distance and said threaded portion of the coupling member and the threaded portion of the thrust nut being arranged to impart to the coupling member a movement through said predetermined distance, and means for arresting the motion of said thrust nut to cause said coupler member to move through said predetermined distance.

3. A disconnect device for coupling a drive shaft with a driven shaft comprising a splined coupler member having splined connections at its ends adapted to be connected to said shafts, said coupling member having a portion thereof screw-threaded, a thrust nut screw-threadedly attached to said threaded portion of the coupler and locked against relative rotation thereon by a substantially non-torque transmitting locking means, said coupling member being disengageable from one of said shafts by longitudinal movement of a predetermined distance and said threaded portion of the coupling member and the threaded portion of the thrust nut being arranged to impart to the coupling member a movement through said predetermined distance, and means for arresting the motion of said thrust nut to cause said coupler member to move through said predetermined distance.

4. The combination with a driving and a driven shaft of means for connecting said shafts comprising a coupling shaft engaging both the driving and driven shafts for the transmission of power from one to the other, a sleeve surrounding and threadably engaging said coupling shaft, releasable locking means between said coupling shaft and said sleeve, and means associated with said sleeve to arrest the rotation thereof during the transmission of power from the driving to the driven shaft and release said locking means, and connections between said coupling shaft and said sleeve whereby relative rotation between the coupling shaft and the sleeve results in relative displacement therebetween to disconnect the driving shaft from the driven shaft.

5. A disconnect device for transmitting power from a driving shaft to a driven shaft comprising coupling means adapted to be connected to said driving and driven shafts, a sleeve surrounding and engaging said coupling means, said sleeve being adapted to rotate therewith during transmission of power from the driving to the driven shaft, a threaded connection between said sleeve and said coupling means, and sleeve arresting means to halt the rotary motion of said sleeve and produce relative motion between the sleeve and said coupling means whereby the latter is displaced longitudinally to disengage one of said shafts.

6. A releasable coupling device for rotary shafts comprising coupling means adapted to be connected to said shafts for carrying the entire load imposed by one of said shafts on the other shaft, a collar releasably and threadedly connected to said coupling means, said collar rotating freely with said coupling means and carrying no part of the load placed by one shaft on the other, and means for releasing the collar from said coupling means and arresting the rotation of said collar to cause translation of the coupling means with relation to the collar and disconnect the shafts.

7. A disconnect device for coupling a driving and a driven shaft comprising a unitary coupling shaft adapted to be connected to both the driving and driven shafts and having threads formed in its surface at a point intermediate of its ends, a sleeve threadably engaging the threaded part of said coupling shaft having at least one peripheral tooth thereon and means limiting its longitudinal movement, a shear pin releasably holding the sleeve on the coupling shaft, and a locking pin adapted to engage said tooth to arrest rotation of the sleeve and shear said shear pin whereupon relative rotation between the sleeve and coupling shaft is produced causing displacement of said coupling shaft relative to said sleeve and its disengagement from one of said coupled shafts.

8. A disconnect device according to claim 7 wherein the locking pin is remotely operated.

9. A disconnect device according to claim 7 wherein the locking pin is automatically operated.

10. A disconnect device for coupling alined driving and driven shaft elements comprising coupling means having a longitudinally displaceable inner sleeve adapted to be connected to said driven and driving shaft elements, an outer sleeve overlying and threadably engaging said inner sleeve for displacing the inner sleeve upon relative rotation, means interposed between said sleeves releasably holding them in said overlying position and against relative rotation, at least one tooth on the periphery of said outer sleeve, and tripping means operable to engage said tooth and halt rotation of said outer sleeve whereupon the inner sleeve is longitudinally displaced and disengaged from at least one of said coupling shafts.

11. A disconnect device according to claim 10 wherein the tripping means is remotely operated.

12. A disconnect device for uncoupling driving and driven elements, comprising a coupling member, said member having coupling splines and grooves adapted to be connected to said elements whereby the elements may be uncoupled by a substantially linear movement of the coupling member with respect to the elements, a second member releasably attached to the coupling member and wholly carried thereby, said second member being screw-threadedly attached to said coupling member for shifting the latter upon relative rotation of the two members and means for engaging said second member during rotation of the elements to cause relative rotation of the two members and the linear shift of the coupling member to an uncoupling position.

13. A disconnect device for uncoupling driving and driven elements comprising a coupling member, said member having coupling splines and grooves adapted to be connected to said elements whereby the elements may be uncoupled by shifting the coupling member out of engagement with one of the elements, an uncoupling member releasably attached to the coupling member and being subjected to no part of the torque transmitted from the driving element to the driven element, said uncoupling member having a shifting operative connection with the coupling member, which becomes effective upon the arrest of the uncoupling member, and means for engaging and arresting said uncoupling member during rotation of the elements to shift the coupling member to an uncoupling position.

14. A disconnect device for transmitting power from one shaft to another comprising a coupling member adapted to be connected to each shaft, means associated with said coupling member and rotating substantially freely therewith during the transmission of power through the coupling means and operably connected therewith to shift the same out of engagement with one shaft upon relative movement, means releasably fastening said means to said member which is subject to no part of the torque transmitted between the shafts, and means for engaging the first said means to produce relative movement between it and said coupling member to disengage said coupling member to interrupt power transmission.

15. A power transfer unit for connecting a driving shaft and a driven shaft having means for interrupting the transmission of power between said shafts, comprising connecting means adapted to be connected to the driving and driven shafts and adapted to be actuated to disconnect the shafts, a member engaging said connecting means for disconnecting the shafts and interrupting the transmission of power, said member having a releasable and threaded connection with said connecting means with no portion of the torque being transmitted from the driving shaft to the driven shaft being carried by the releasable connection, said member being adapted upon release from the connecting means to disconnect the shafts, and an actuating assembly associated with said member to release the latter from said connecting means and cause it to disconnect the shafts.

16. A power transfer unit according to claim 15 wherein the actuating assembly is remotely operated.

17. A power transfer unit according to claim 15 wherein the actuating assembly is automatically operated.

18. A disconnect device for coupling a driving and a driven shaft comprising coupling means adapted to be connected to said shafts, and adapted to be moved out of engagement therewith, a member releasably locked to said means for rotation therewith, means for producing relative rotation between said member and said coupling means to move said coupling means and means for releasing said member to permit relative rotation with respect to said coupling means whereby the transmission of power from the driving shaft to the driven shaft is interrupted.

19. A disconnect device for transmitting power from a driving shaft to a driven shaft comprising coupling means adapted to be connected to said shafts but adapted to be shifted from engagement with one of the shafts, a sleeve surrounding the coupling means and having connections with said coupling means for shifting the coupling means upon relative rotation thereof, said sleeve having a non-torque transmitting fastening means with said coupling means for rotation therewith and sleeve arresting means adapted to engage and halt the rotary motion of said sleeve for producing relative motion therebetween for shifting the coupling means.

20. A disconnect device of the character set forth in claim 19 wherein the device is housed within a unitary housing and may operatively as a unit be mounted between a power unit and auxiliary unit.

21. A disconnect device of the character set forth in claim 19 wherein the coupling means remains in engagement with one of the shafts in both positions thereof.

JOHN DINEEN.

REFERENCES CITED

The following references are of record in the file of this patent:

UNITED STATES PATENTS

| Number | Name | Date |
|---|---|---|
| 431,066 | Leverick | July 1, 1890 |
| 650,283 | Turney | May 22, 1900 |
| 1,430,627 | Cleland | Oct. 3, 1922 |
| 1,480,239 | Chaplin | Jan. 8, 1924 |
| 1,943,321 | Hyland | Jan. 16, 1934 |
| 2,465,054 | Berg | Mar. 22, 1949 |